Figure 1:
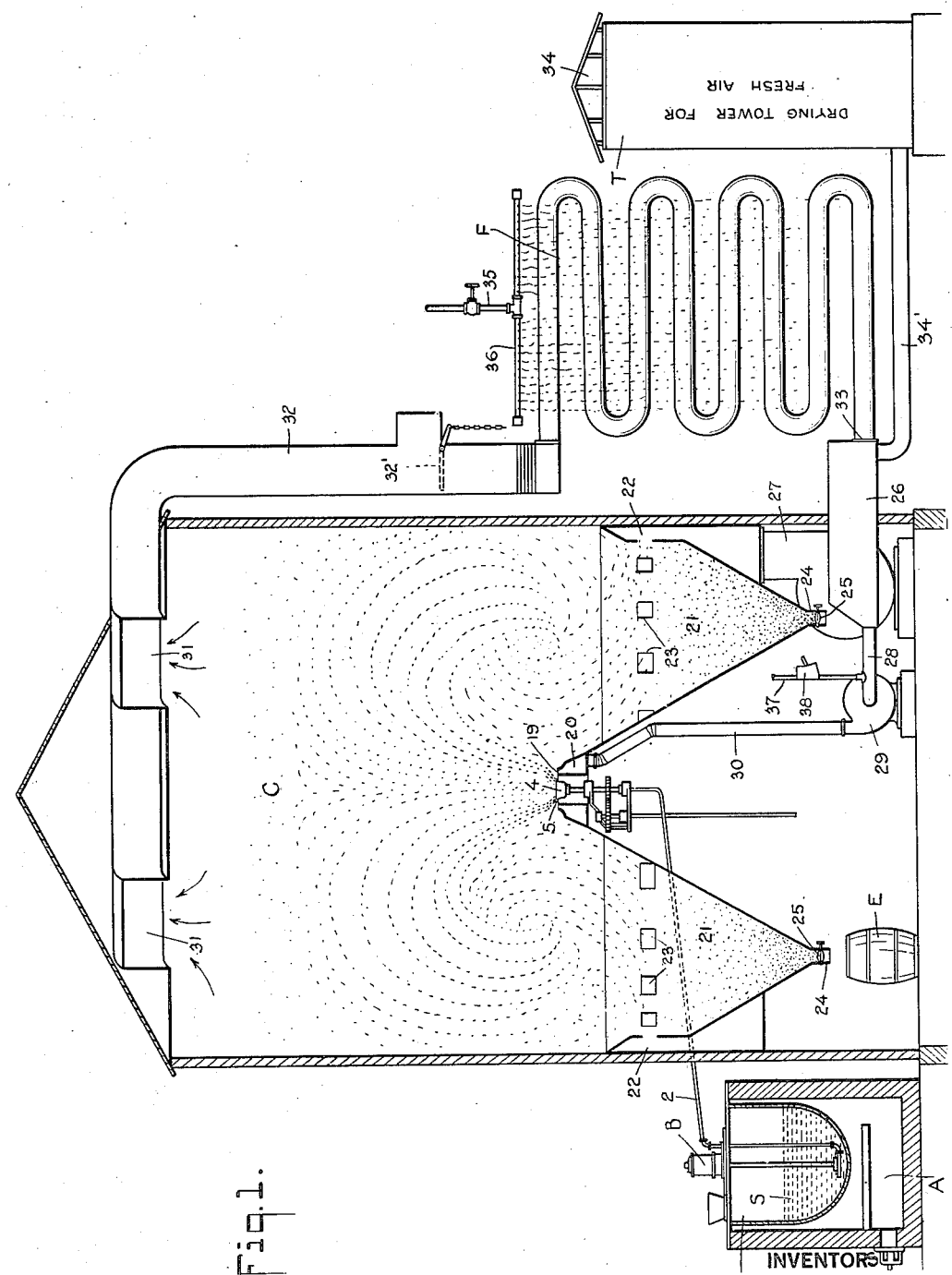

Oct. 5, 1926.                                                  1,601,898
R. E. WILEY ET AL
GRANULAR PRODUCT AND METHOD OF PRODUCING SAME
Filed July 9, 1925          2 Sheets-Sheet 1

INVENTORS
Roy E. Wiley
Carl F. Mensing
BY
ATTORNEY

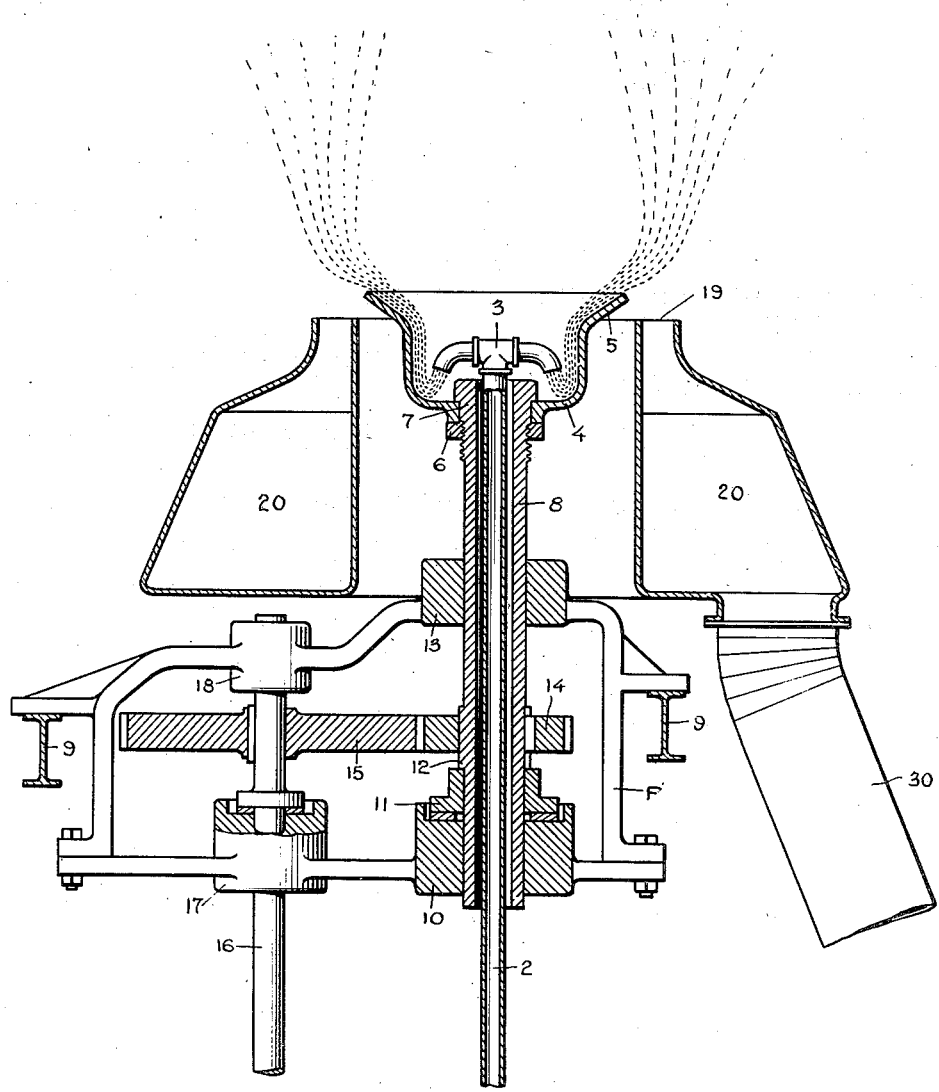

Patented Oct. 5, 1926.

1,601,898

UNITED STATES PATENT OFFICE.

ROY E. WILEY, OF PLAINFIELD, AND CARL E. MENSING, OF SOMERVILLE, NEW JERSEY.

GRANULAR PRODUCT AND METHOD OF PRODUCING SAME.

Application filed July 9, 1925. Serial No. 42,345.

This invention relates to granular product and method of producing the same, and has particular application to a caustic alkali material treated by the method hereinafter described in detail to produce the same in substantially granular form, as contradistinguished from the fused, powdered or flaked condition, and which caustic alkalies, such as caustic soda (sodium hydroxide), lye (potassium hydroxide) and the like, have been marketed in the trade.

In the present instance, for the sake of illustration, we have described our invention as relating to a granular caustic soda product and the method of obtaining the same, although we wish it to be understood that the invention is not limited to this particular material, but is also applicable to other caustic alkalies, such as potassium hydroxide and other substances possessing similar properties, and which it is desired to reduce to granular form.

Heretofore caustic soda has been produced and marketed in fused, powdered and flaked form and is well known in the trade. There are, however, certain well recognized disadvantages incident to the material in the aforementioned conditions. Caustic soda, of course, absorbs moisture with great rapidity when exposed to the atmosphere so that great care is required in storing and handling the same in either fused or ground or flaked condition. Furthermore, if such material, when in ground or flaked condition, is allowed to absorb sufficient moisture and then dried it assumes the form of a caked, lumpy, homogeneous mass, and must be reprocessed to restore it to its original condition, with the consequent expenditure of time and labor and the resultant increase in cost.

For many purposes or uses, it is, of course, desirable to keep the caustic soda in a loose sub-divided condition, so that it is composed of fine particles, and may therefore be poured, sifted or handled and used to advantage.

This we accomplish with the present invention, for we produce the material in the form of small granules or globular particles which may be of any size, and which, owing to the minute points or areas of contact between the granular particles forming the mass, will not, when exposed to moisture, dry, stick, cake or compact to the degree as when in the flaked or powdered condition. On the contrary, should our material in its granular form absorb moisture sufficient to cause the particles to adhere, the application of very slight pressure, as by crushing, rubbing or the like, is sufficient to cause the detachment of the particles and the consequent crumbling or reduction of the mass to its original granular form. This is impossible with the usual flaked or powdered material, because of the large areas of surface contact between the particles thereof. Such a mass instead of crumbling under the application of force will break with a crystalline fracture, merely resulting in the production of hard, lump-like portions, and the only remedy is to reprocess the cake-like mass, as heretofore stated.

Another object of our invention is to lessen the moisture absorbing qualities of the loose mass of caustic soda by mixing therewith an inert inorganic substance, such as talc or the like, in the form of a fine powder. This is particularly advantageous and adaptable to the caustic soda in its granular or globular form, as the granules, becoming completely coated with the fine inert material will be thus protected to some extent from the action of moisture, and consequently the tendency of the mass to absorb moisture is retarded and decreased. Therefore, in the present instance it is our purpose to produce caustic soda or materials possessing similar moisture absorbing qualities, in loose, granular, spherical or globular form, and to retard or decrease the moisture absorbing qualities of caustic soda material by the use and application or admixture therewith of a fine or powdered inert inorganic material.

With the above recited objects and others of a similar nature and view, our invention consists in the product and in the method of producing the same set forth in and falling within the scope of the appended claims.

In the drawings we have shown, and we herein describe, one form of apparatus useful in practicing the method and producing the product, although we wish it to be understood that we are not limited in the practice of our present invention to this particular apparatus. The latter forms the subject matter of a separate application, that of Roy E. Wiley and Carl E. Mensing, filed July 9, 1925, Serial No. 42,344, apparatus for producing granular products.

In the accompanying drawings, Fig. 1 is a view partly in vertical section and partly in elevation of an apparatus for carrying out my invention.

Fig. 2 is an enlarged vertical sectional view taken through the centrifugal distributor mechanism of the apparatus.

In the practice of our invention the material to be treated, such as the caustic soda indicated in Fig. 1 as S, is placed in the pot 1 of a still A, here conventionally illustrated, and is reduced to a fused or fluid form. From the still the fused or fluid-like caustic soda is forced, by a centrifugal pump B, of any well known form, through the supply pipe 2 to the nozzle head 3 carried at the upper end of the pipe 2 and disposed within the confines of the centrifugal distributor bowl 4, as clearly shown in Fig. 2. The upper portion of the wall of the distributor bowl is outwardly flared as at 5 to the proper degree to give adquate distribution, as hereinafter described. The distributor bowl is secured to the upper end by a threaded locking ring 6 at the upper shouldered end 7 of the revolving sleeve 8, so that the bowl will turn or revolve with the sleeve when the latter is driven. The upper vertical section of the supply pipe 2 extends through this sleeve 8, as clearly shown in Fig. 2. This sleeve 8 is mounted to revolve on bearings carried by the frame F which also acts to support the drive gearing. The frame F may be of any suitable form, and in the present instance is mounted upon I-beams 9—9 and has a foot block 10 supporting a thimble 11 on which rests the shoulder 12 of the sleeve 8. The upper portion of the frame carries a collar 13 through which the sleeve extends, the lower portion of the sleeve also extending through the bore of the foot block 10, as will be seen by reference to Fig. 2. Keyed on the shoulder portion 12 of the sleeve is a pinion 14 meshing with the gear 15 splined on the drive shaft 16, the bearings for the drive shaft 16 being shown as carried by the frame as at 17 and 18. This drive shaft 16 is driven from any suitable motor, such as a small electric motor (not shown).

From the apparatus thus far described, it will be seen that when the centrifugal pump B is in operation pumping the caustic soda S, and the centrifugal distributing bowl is revolving through the operation of the driving mechanism thereof, the fused fluid-like caustic soda will flow through the nozzle head 3 into the distributing bowl 4 and then the rapid revolution of the latter will be moved upward in the form of a thin film to the outer extremity of the bowl from which it is thrown horizontally by centrifugal force into a strong blast of cold dry air issuing from the open end or mouth 19 of the air chamber 20 surrounding the distributing bowl. The combined action of the distributing bowl and the blast of air cause the material to be thrown upward and outward into the large chamber C in the form of a spray or fountain.

As will be seen by reference to Fig. 1, this air chamber 20 is located above and centrally of the caustic soda collecting hopper 21, which extends horizontally of the chamber C, and the top portion of this hopper is formed by a circular air duct 22 having at suitable intervals air ports 23. The walls of the hopper converge downwardly, and the lower end of such hopper is provided, also at suitable intervals, with discharge spouts 24 each controlled by a valve 25 of any suitable form.

It is obvious from the construction of the apparatus as shown in Fig. 1 that it is the purpose to supply a blast of air directly at and beneath the material issuing from the distributing bowl to toss such material upward and outward in the form of a spray, and that it is also the purpose to supply additional currents of air through the ports 23 to supply additional cold dry air into the chamber C in such quantities as may be necessary for carrying away the heat given up or driven off by the falling particles of caustic soda on cooling in contact with the upward moving currents of air. Of course the air blast may be supplied in any suitable manner, and in the present instance we have shown an air box 26 connected with the blower 27 which supplies air to the circular air duct 22 forming the top of the hopper, and this air box 26 is also connected to the pipe 28 with a second blower 29 which supplies air to the air chamber 20 through the pipe 30. The blower 27 supplies air under low pressure to cause mild currents of air in chamber C, and blower 29 supplies air at a much higher pressure into chamber 20 for the purpose of making a strong blast where material leaves the bowl. As the air passes from the circular air duct 22 through the ports 23 into the chamber C, and also through the air chamber 20 surrounding the centrifugal distributor bowl, it strikes the material coming from the distributor bowl and tosses or sprays the same upward or outward in the chamber, causing the now separated particles of material to remain suspended in the air for a sufficient length of time to cool such particles by driving off the heat, the latter finally falling or dropping into the hopper 21 and may be drawn off through the spouts 24 into suitable containers, such as barrels E.

Now it is important to note that as the material issues from the distributing bowl under whirling centrifugal action and is subjected to the blasts of air, the mass of material will be separated in the form of a spray and the particles thereof will, under the combined centrifugal and air action as described, assume the form of small granules or spherical or globular particles, examination showing that these particles are in the form of practically perfect little spheres or globules.

The air after performing its function within the large chamber or housing C passes through air ports 31 beneath the roof of the chamber C into the air tube 32 which communicates at its lower end with the cooling device F, which may be of any suitable character, in the present instance a cooling coil, and at its lower end the cooling coil leads into the air box 26, as shown at 33. In order to insure an adequate supply of dry air for the operation, we provide any suitable arrangement, such for example as an air drying tower T, packed with any suitable dehydrating material, such for example as calcium chloride. This tower is preferably provided with an air intake in the form of the ventilated or shuttered roof 34, and the air drawn into the tower passes out at the bottom of the latter through the air duct 34' to the air box 26, and from which it, of course, is drawn by the blowers into the chamber C.

It will be noted that we also provide the exhaust air flue 32 with a suitable damper 32' which, when opened, will permit the escape of the air drawn from the chamber C before it can pass to the cooling coil F. We provide this damper because in some instances, particularly at the beginning of the operation of treating the material, the air fed into the chamber C may carry too great a quantity of moisture and consequently owing to the hygroscopic tendencies of the material being treated would become absorbed by the latter, thereby causing the material passing into the collecting hopper to possess more moisture than might be desirable. By providing the damper the air being exhausted from the chamber C and carrying this excess amount of moisture may be discharged into the atmosphere. In practice it is only necessary to use this damper for a short time, for example at the beginning of the operation, and it may then be closed down and the air passed direct into the cooling coils and thence on back into the system. Cold water from any suitable source may be passed through the valve pipe 35 and sprayed through the perforated pipe 36 on the coils of the cooling device F for the purpose of cooling down the air passing through the coils. The cooled air passing from the coils is thus passed into the air box 26 and returned to the apparatus in cooled condition to again perform the function of treating the sprayed material in the chamber C.

During the operation of treating the fused material to reduce it to its granular form, inert inorganic material, such as powdered talc, may advantageously be supplied for the purpose of mixing with the caustic soda, thereby coating the granular particles to reduce or retard the moisture absorbing capabilities of such particles as before mentioned, and for this purpose such inert inorganic material in powder form may be fed from a suitable source of supply (not shown) through the pipe 37 controlled by any suitable measuring device 38, into the air pipe 28 leading to the blower 29, and being drawn into the blower to pass with the air through the pipe 30 into the air chamber 20 surrounding the distributor bowl and will be blown through the mouth 19 of this air chamber 20 into direct contact with the caustic soda material as it issues from the centrifugal distributor bowl, and will intimately mix therewith, floating or being suspended in the air in admixture with the material during the operation of cooling and drying the latter. Thus when the material settles or falls down into the hopper and into the barrels or other receptacles E the small globular particles will be coated with the talc or other inert inorganic powder for the purpose before mentioned.

While we have herein shown and described one embodiment of our invention, we wish it to be understood that we do not limit ourselves to all the precise details herein set forth by way of illustration, as modification and variation may be made without departing from the spirit of the invention or exceeding the scope of the appended claims.

What we claim is:

1. As a new product of manufacture, an alkali body composed of uniform and regular granular particles of substantially spherical or globular form.

2. As a new product of manufacture, caustic soda in the form of regularly formed substantially spherical or globular granular particles.

3. As a new product of manufacture, an alkali body composed of regularly formed substantially globular dry granular particles in union with an inert inorganic powder.

4. As a new product of manufacture, a body of caustic soda composed of regularly formed substantially globular dry granular particles coated with an inert inorganic powder.

5. The herein described method which comprises subjecting a fused mass of alkali to centrifugal action and also to the action of an air blast to reduce the mass to a body of granular particles.

6. The herein described method which comprises subjecting a mass of caustic alkali to centrifugal action and to the action of an air blast to cool and dry the mass and to reduce the latter to a body of granules.

7. The herein described method which comprises subjecting a mass of caustic alkali to centrifugal action and simultaneously to the action of an air blast to cool and dry the mass and to reduce the same to a body of substantially globular or spherical particles.

8. The herein described method which comprises reducing a mass of caustic soda to a fused condition, subjecting the same to centrifugal action, to toss the mass outward and subjecting the mass so tossed to the action of a blast of cooled air to eliminate heat from the mass and to reduce the latter to a body of substantially globular or spherical particles.

9. The herein described method which comprises subjecting a spray of caustic alkali to centrifugal action and to an air blast to reduce the mass to substantially globular or spherical particles and simultaneously adding thereto an inert inorganic powder to coat the particles and retard the hygroscopic action thereof.

10. The herein described method which comprises heating a body of caustic soda to reduce the same to a fused mass, conducting said mass to a centrifugal device and ejecting the same therefrom by centrifugal action and simultaneously subjecting the ejected mass to the action of cooled air blasts striking the mass at different points to eliminate the heat therefrom and to reduce the mass to a body of separate globular particles.

Signed at New York, in the county of New York and State of New York, this 2nd day of July A. D. 1925.

ROY E. WILEY.
CARL E. MENSING.